US012767306B2

(12) United States Patent
Asao

(10) Patent No.: US 12,767,306 B2
(45) Date of Patent: Oct. 20, 2026

(54) BOAT PROPULSION DEVICE AND BOAT

(71) Applicant: YAMAHA HATSUDOKI KABUSHIKI KAISHA, Iwata (JP)

(72) Inventor: Hiroshi Asao, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 217 days.

(21) Appl. No.: 18/818,709

(22) Filed: Aug. 29, 2024

(65) Prior Publication Data

US 2025/0074567 A1 Mar. 6, 2025

(30) Foreign Application Priority Data

Sep. 1, 2023 (JP) ................................ 2023-142266

(51) Int. Cl.

*B63H 20/32* (2006.01)
*B63H 21/17* (2006.01)
*B63H 21/36* (2006.01)
*F02B 61/04* (2006.01)

(52) U.S. Cl.

CPC ............ *B63H 20/32* (2013.01); *B63H 21/17* (2013.01); *B63H 21/36* (2013.01); *F02B 61/045* (2013.01)

(58) Field of Classification Search

CPC ........ B63H 20/32; B63H 21/17; B63H 21/36; F02B 61/045

See application file for complete search history.

(56) References Cited

U.S. PATENT DOCUMENTS

| | | | | |
|---|---|---|---|---|
| 9,180,950 | B1 * | 11/2015 | Davenport | B63H 20/32 |
| 11,046,409 | B2 * | 6/2021 | Wiegele | B63H 20/28 |
| 2007/0254539 | A1 * | 11/2007 | Yazaki | F02B 61/045 440/77 |
| 2018/0327067 | A1 * | 11/2018 | Hasegawa | F02B 61/045 |
| 2019/0002071 | A1 | 1/2019 | Hasegawa | |
| 2019/0002072 | A1 | 1/2019 | Hasegawa | |
| 2022/0204148 | A1 * | 6/2022 | Hasegawa | F02M 35/1015 |
| 2023/0257094 | A1 * | 8/2023 | Jaszewski | B63H 20/007 440/6 |
| 2024/0158060 | A1 * | 5/2024 | Przybyl | B63H 20/007 |

FOREIGN PATENT DOCUMENTS

| | | | |
|---|---|---|---|
| JP | 2004050921 | A | 2/2004 |
| JP | 2019010992 | A | 1/2019 |
| JP | 2019010993 | A | 1/2019 |
| JP | 2022104230 | A | 7/2022 |

OTHER PUBLICATIONS

Official Communication issued in corresponding European Patent Application No. 24193091.6, mailed on Feb. 6, 2025, 5 pages.

* cited by examiner

*Primary Examiner* — Matthew Wiblin
(74) *Attorney, Agent, or Firm* — Keating & Bennett, LLP

(57) ABSTRACT

A boat propulsion device includes an internal structure, a pair of facing covers facing each other across the internal structure in a first direction along a horizontal direction and defining an opening to expose an upper portion of the internal structure, a connector extending in the first direction and connecting the pair of facing covers together, and an upper cover to cover the opening and including a hook to engage the connector. The hook engages the connector that connects the pair of facing covers.

20 Claims, 12 Drawing Sheets

BOAT PROPULSION DEVICE AND BOAT

CROSS REFERENCE TO RELATED APPLICATIONS

This application claims the benefit of priority to Japanese Patent Application No. 2023-142266 filed on Sep. 1, 2023. The entire contents of this application are hereby incorporated herein by reference.

BACKGROUND OF THE INVENTION

1. Field of the Invention

The technologies disclosed herein relate to boat propulsion devices and boats.

2. Description of the Related Art

Conventionally, outboard motors are known in which an internal structure such as an engine is covered by a plurality of covers (see, e.g., JP 2022-104230 A, JP 2019-10992 A, JP 2019-10993 A). The plurality of covers include an upper cover and a pair of facing covers. The pair of facing covers are arranged to face each other across the internal structure to form an opening that exposes the upper portion of the internal structure. The upper cover is arranged to cover the opening.

In conventional outboard motors, it is sometimes impossible to precisely align and position the pair of facing covers and the upper cover because, e.g., the positional relationship of one facing cover to the upper cover differs from that of the other facing cover. This problem is not limited to outboard motors but is also common to other boat propulsion devices, such as inboard and outboard motors.

SUMMARY OF THE INVENTION

Example embodiments of the present invention solve one or more of the above-mentioned problems.

The example embodiments disclosed herein can be implemented in the following aspects.

A boat propulsion device according to an example embodiment of the present invention includes an internal structure, a pair of facing covers facing each other across the internal structure in a first direction along a horizontal direction and defining an opening to expose an upper portion of the internal structure, a connector extending in the first direction to connect the pair of facing covers together, and an upper cover to cover the opening and including a hook to engage the connector. According to this boat propulsion device, the hook of the upper cover engages the connector that connects the pair of facing covers so that the pair of facing covers and the upper cover are aligned and positioned with high precision.

The above boat propulsion device may be configured such that the connector is provided on the facing walls of the pair of facing covers, the hook is provided on the lower surface of the upper cover, and the connector and the hook are covered by the pair of facing covers and the upper cover. According to this boat propulsion device, an engaged portion between the connector and the hook is not exposed to the outside, which improves the design and appearance of the boat propulsion device.

The above boat propulsion device may be configured such that the upper cover is operable to pivot about the connector, is movable between a closed position that covers the opening and an opened position that opens at least a portion of the opening, and is detachable from the pair of facing covers. According to this boat propulsion device, the upper cover can be easily displaced to the closed position and to the opened position by pivoting about the connector while maintaining the positional relationship of the three covers. In addition, according to this boat propulsion device, only the upper cover can be removed to perform work (such as maintenance) on the internal structure.

The above boat propulsion device may be configured such that one of the upper cover and the pair of facing covers is provided with a recess, and the other of the upper cover and the pair of facing covers is provided with a protrusion to be inserted into the recess when the upper cover is in the closed position and is spaced apart from the recess when the upper cover is in the opened position. According to this boat propulsion device, when the upper cover is in the closed position, the protrusion is insertable into the recess to enable the three covers to be aligned and positioned with greater precision.

The above boat propulsion device may be configured such that an elastic body is between the connector and the hook. According to this boat propulsion device, the rattling of the upper cover against the facing covers can be reduced or prevented, and vibrations can be absorbed.

The above boat propulsion device may be configured such that the internal structure includes at least one of a controller and a drive source, the boat propulsion device further includes a fastener to fix the pair of facing covers to the internal structure, and the upper cover covers the fastener. According to this boat propulsion device, the upper cover can be positioned with respect to the facing covers across the internal structure. Also, according to this boat propulsion device, the fastener is not exposed to the outside, which improves the design and the appearance of the boat propulsion device.

The above boat propulsion device may be configured such that the upper cover includes a lower edge spaced apart from the pair of facing covers. According to this boat propulsion device, it is possible to reduce or prevent the direct influence of deformation of the upper cover on the pair of facing covers.

The above boat propulsion device may be configured such that the internal structure is provided with a hang tab exposed to the opening. According to this boat propulsion device, the hang tab can be used to lift up the boat propulsion device by removing only the upper cover.

The above boat propulsion device may be configured such that the hang tab includes a hanging portion that protrudes upwardly from the opening. According to this boat propulsion device, e.g., a boat propulsion device in a lying down state can be lifted up using the hang tab.

The above boat propulsion device may be configured such that each of the facing covers includes a contact portion that contacts the hook in the first direction. According to this boat propulsion device, misalignment of the upper cover with respect to the pair of facing covers in the first direction can be reduced or prevented.

The above boat propulsion device may be configured such that the connector is located at a rear end of the upper cover, and the boat propulsion device further includes a fastener to fix a front end of the upper cover to the internal structure. In this boat propulsion device, the rear end of the upper cover is positioned with respect to the facing covers by the hook while the front end of the upper cover is fixed by the fastener. As a result, according to this boat propulsion device, the pair of facing covers and the upper cover can be precisely aligned and positioned, while the fastener is reduced or prevented from affecting the design and appearance of the boat propulsion device when the boat propulsion device is viewed from the rear.

The above boat propulsion device may be configured such that the connector includes a cylinder provided on one of the pair of facing covers, and an insert provided on the other of the pair of facing covers inserted into the cylinder. According to this boat propulsion device, misalignment between the pair of facing covers can be effectively reduced or prevented.

The above boat propulsion device may be configured such that the hook engages a portion of the connector where the insert is inserted into the cylinder. According to this boat propulsion device, the load from the hook can be distributed by the pair of facing covers.

A boat propulsion device according to another example embodiment of the present invention includes an internal structure, a pair of facing covers facing each other across the internal structure in a first direction and defining an opening to expose a side of the internal structure in a second direction perpendicular to the first direction, a connector extending in the first direction to connect the pair of facing covers together, and a cover to cover the opening and including a hook to engage the connector. According to this boat propulsion device, the hook of the cover engages the connector that connects the pair of facing covers, so that the pair of facing covers and the cover can be aligned and positioned with high precision.

The technologies disclosed herein can be implemented in various ways, e.g., as an outboard motor, a boat propulsion device, a boat equipped with a boat propulsion device, and a method to align a plurality of covers.

According to the boat propulsion devices disclosed herein, a pair of facing covers and a cover can be aligned and positioned with high accuracy.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Figure 1:
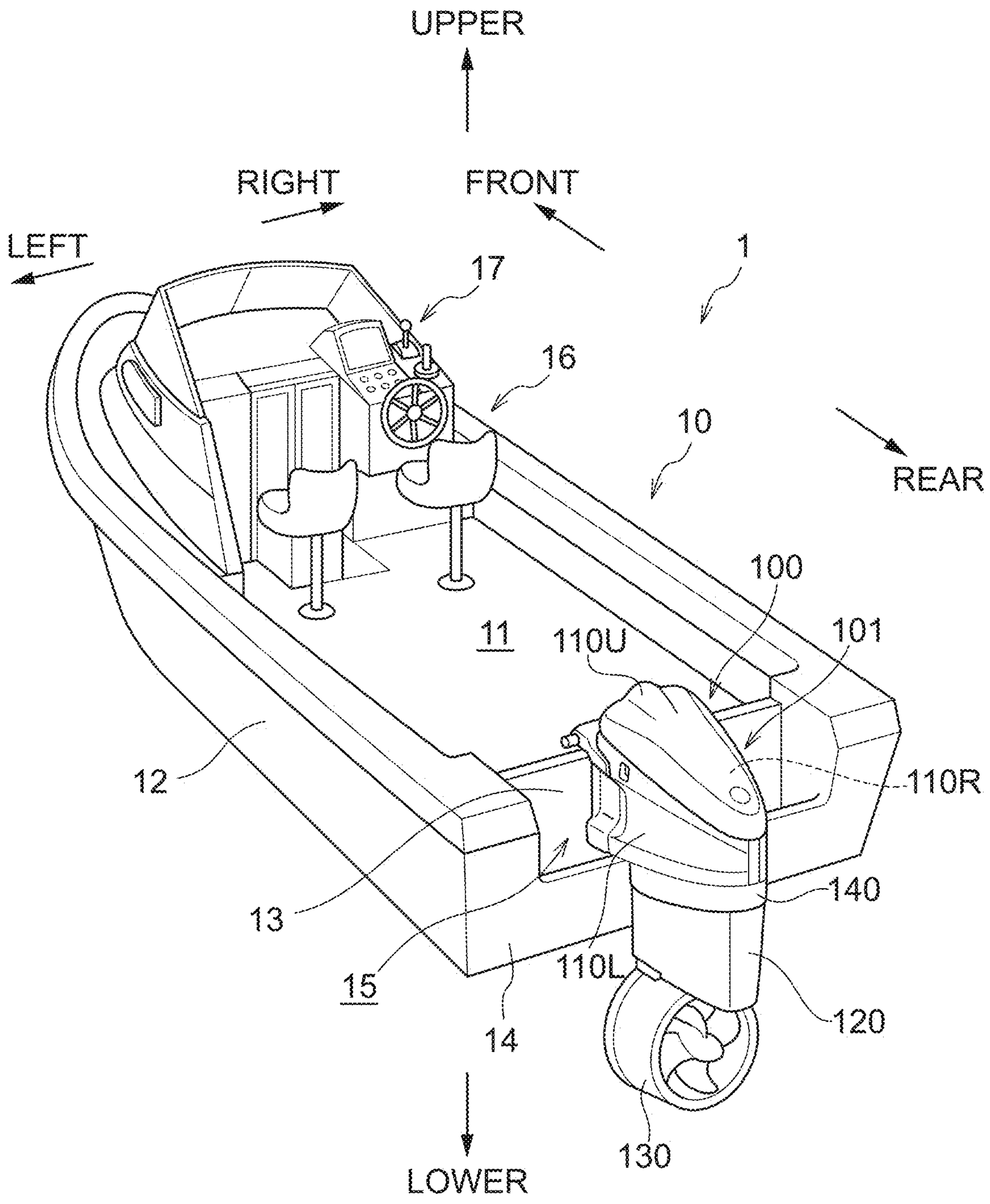
FIG. 1 is a perspective view schematically illustrating a configuration of a boat according to an example embodiment of the present invention.

FIG. 1 is a perspective view schematically illustrating the configuration of a boat 1 according to an example embodiment of the present invention. FIG. 1 and other figures described below show arrows representing each direction with respect to the position of the boat 1. More specifically, each figure shows arrows representing front (FRONT), rear (REAR), left (LEFT), right (RIGHT), upper (UPPER), and lower (LOWER) directions, respectively. The front-rear direction, left-right direction, and upper-lower direction (vertical direction) are orthogonal to each other. As shown in FIG. 1, the boat 1 includes a hull 10 and an electric propulsion device 100. The electric propulsion device 100 is an example of a boat propulsion device.

The hull 10 is an area of the boat 1 for occupants to ride. As shown in FIG. 1, the hull 10 includes a hull body 12 including a living space 11, a pilot seat 16 in the living space 11, and an operator 17 near the pilot seat 16. The operator 17 maneuvers the boat and includes, e.g., a steering wheel, a shift throttle lever, a joystick, a monitor, and an input device. The hull 10 also includes a partition wall 13 that partitions the rear end of the living space 11 and a transom 14 at the rear end of the hull 10. In the front-rear direction, a space 15 exists between the transom 14 and the partition wall 13.

Figure 2:
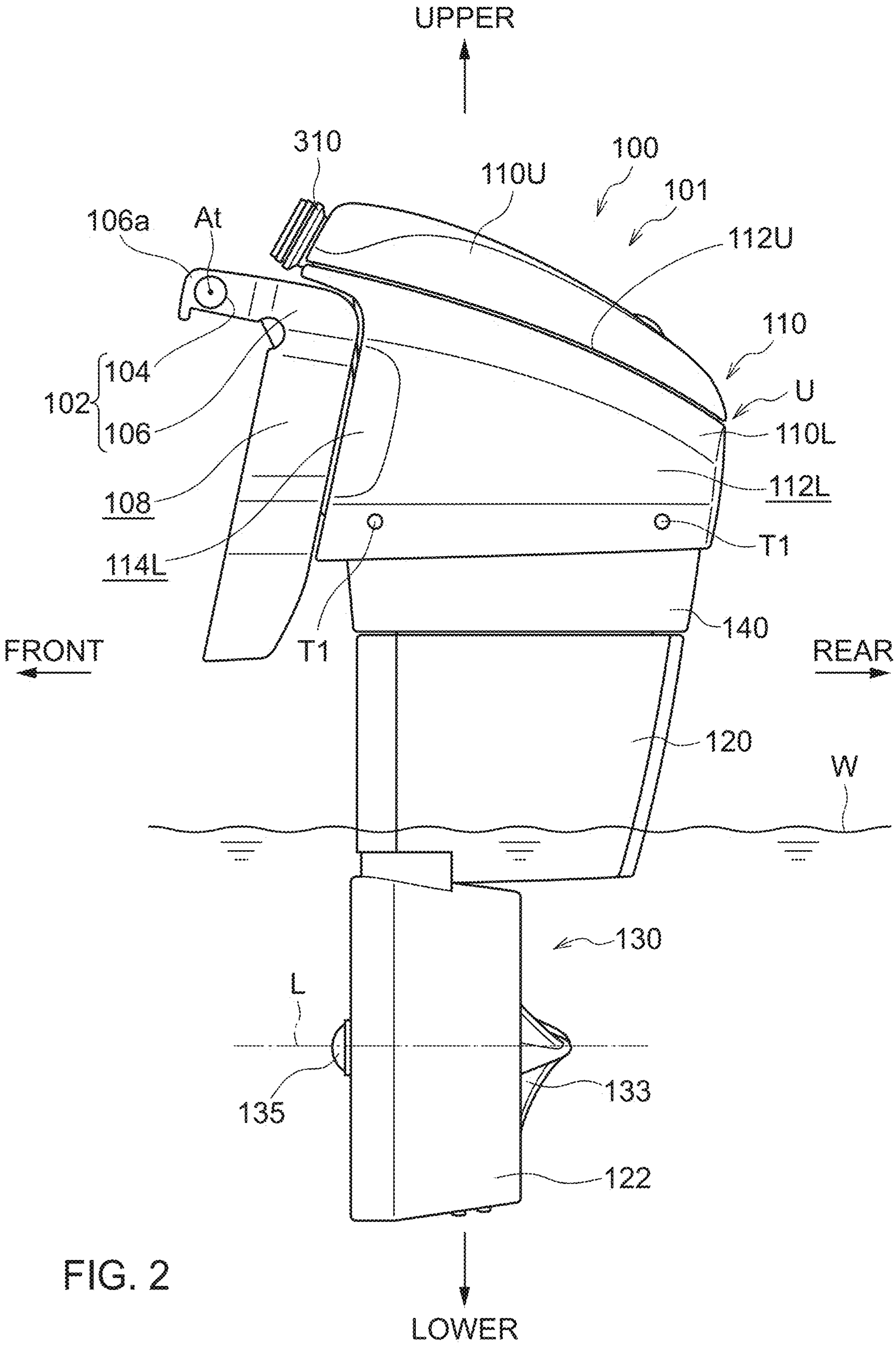
FIG. 2 is a side view schematically illustrating a configuration of an electric propulsion device.

FIG. 2 is a side view schematically illustrating a configuration of an electric propulsion device 100. The electric propulsion device 100 generates a thrust to propel the boat 1. The electric propulsion device 100 is driven by an electric motor (an example of a drive source). In the following, the electric propulsion device 100 in the reference attitude will be described unless otherwise specified. The reference attitude of the electric propulsion device 100 is when the boat 1 is running (attitude shown in FIG. 1) and in which the propeller rotation axis L of the propeller 132 (described below) extends in the front-rear direction. The front-rear direction, the left-right direction, and the upper-lower direction are defined based on the electric propulsion device 100 being in the reference attitude.

The electric propulsion device 100 is attached to the transom 14 at the rear (stern) of the hull 10 (see FIG. 1). As shown in FIG. 2, the electric propulsion device 100 includes a propulsion device main body 101 and a suspension device 102.

The suspension device 102 attaches the propulsion device main body 101 to the hull 10. The suspension device 102 includes a tilt shaft 104, a pair of left and right clamp brackets 106, and a connection bracket 109 (see FIG. 5).

The pair of left and right clamp brackets 106 are disposed behind the hull 10 in a state separated from each other in the left-right direction and fixed to the transom 14 of the hull 10 by using, e.g., bolts. Each clamp bracket 106 includes a cylindrical supporting portion **106*a*** with a through-hole extending in the left-right direction.

The tilt shaft 104 is a rod-shaped member. The tilt shaft 104 is rotatably supported in the through-hole of the supporting portion **106*a* of the clamp bracket 106. The tilt axis At, which is the center line of the tilt shaft 104, extends in the horizontal direction (left-right direction) to allow the electric propulsion device 100** to tilt therearound.

The connection bracket 109 is sandwiched between the pair of clamp brackets 106 in the left-right direction and is supported by the supporting portion 106*a* of the clamp brackets 106 via the tilt shaft 104 in such a manner that the connection bracket 109 can rotate about the tilt axis At. The connection bracket 109 is fixed to the base of the propulsion device main body 101 (not shown). The connection bracket 109 is driven to pivot about the tilt axis At with respect to the clamp bracket 106 by a tilt device (not shown) including an actuator such as a hydraulic cylinder.

When the connection bracket 109 rotates about the tilt axis At with respect to the clamp bracket 106, the propulsion device main body 101 fixed to the connection bracket 109 also rotates about the tilt axis At. This achieves the tilting action of rotating the propulsion device main body 101 in the upper-lower direction with respect to the hull 10. By this tilting action, the electric propulsion device 100 can change the angle about the tilt axis At of the propulsion device main body 101 in the range from a tilt-down state in which the propeller 132 is in the water (the state in which the electric propulsion device 100 is in the reference attitude, i.e., the state shown in FIG. 2) to a tilt-up state in which the propeller 132 is located above the waterline. Trimming action to adjust the attitude of the boat 1 during travel can also be performed by adjusting the angle around the tilt axis At of the propulsion device main body 101.

The propulsion device main body 101 includes a cowl 110, a middle housing 140, a lower housing 120, a duct 122, and a drive unit 130.

An internal structure 300 (e.g., see FIG. 10) is disposed on a base fixed to the connection bracket 109 of the suspension device 102. The internal structure 300 is located at the upper portion of the electric propulsion device 100 (propulsion device main body 101), in other words, a structure exposed to the outside when an upper cover 110U described below is removed. In the present example embodiment, the internal structure 300 includes a motor control unit (MCU) to control the electric motor 134 and a gear mechanism described below. The cowl 110 covers the internal structure 300. The detailed configuration of the cowl 110 is described below.

The middle housing 140 is fixed to the underside of the base, and the lower housing 120 is disposed below middle housing 140. The lower housing 120 extends downward from the middle housing 140. The duct 122 is disposed below the lower housing 120. The duct 122 is tubular in shape. The duct 122 is disposed below the water surface W (see FIG. 2). The drive unit 130 is disposed in the duct 122.

Figure 3:
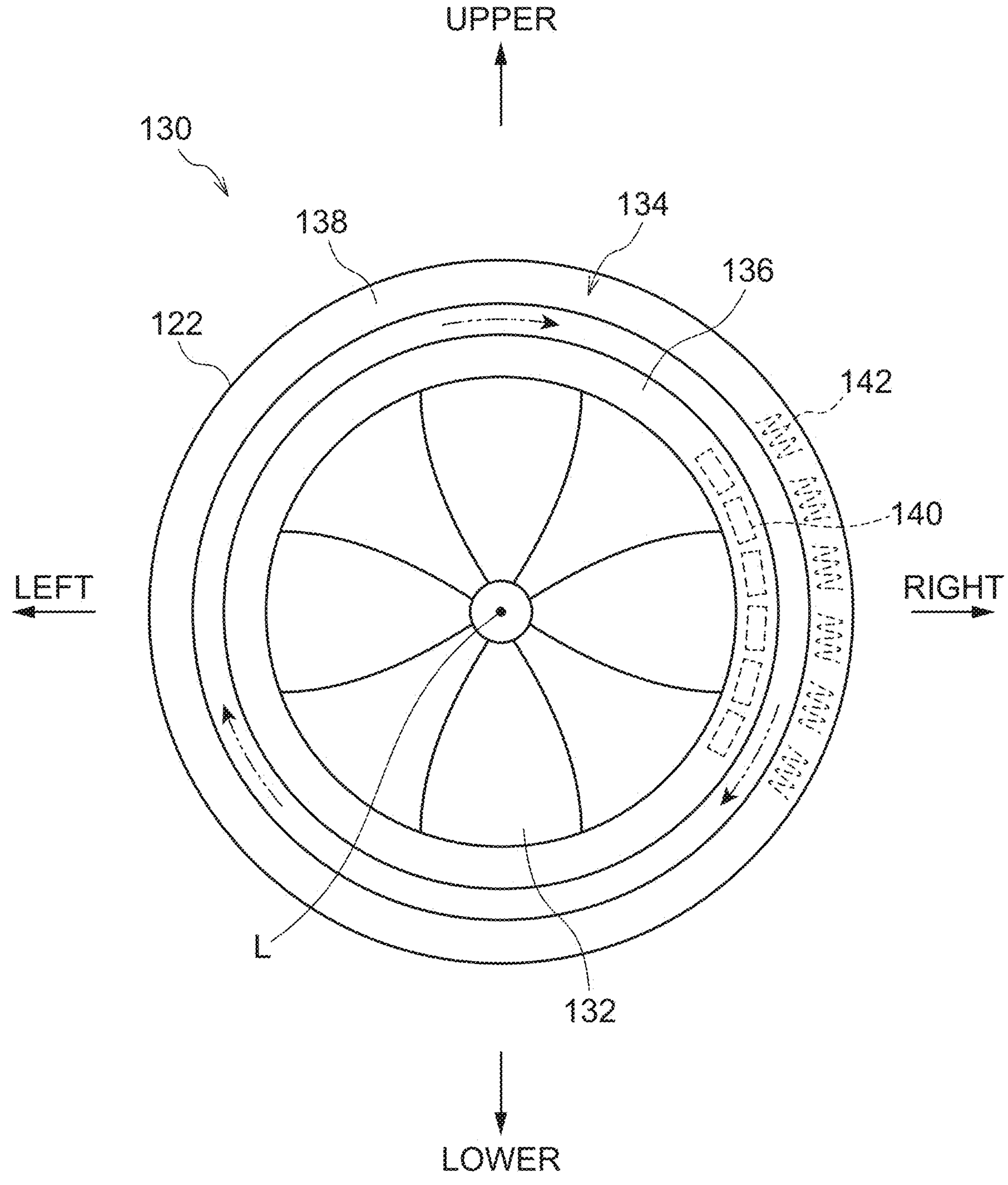
FIG. 3 is a schematic view illustrating a configuration of a drive unit.

FIG. 3 is a schematic view illustrating a configuration of the drive unit 130. The drive unit 130 generates a thrust to propel the boat 1. As shown in FIG. 3, the drive unit 130 includes a propeller 132 and an electric motor 134. The electric motor 134 is an example of the drive source.

The propeller 132 is a rotating body having a plurality of wings or blades and generates a thrust by rotating. The propeller 132 is located at the inner side of the duct 122 and is rotatable about a horizontal propeller rotation axis L. The propeller rotation axis L is parallel to the central axis of the duct 122. The duct 122 covers the entire circumference of the propeller 132, and the duct effect of the duct 122 increases the velocity of water flowing into the duct 122.

A stator fin 133 and a bearing 135 are provided radially inward of the duct 122. The bearing 135 supports the propeller 132 rotatably about the propeller rotation axis L. The stator fin 133 includes a plurality of fins (e.g., three fins). The plurality of fins are arranged radially around the bearing 135, equally spaced around the propeller rotation axis L, and fixed to the duct 122. The plurality of fins are provided behind the propeller 132 so that they protrude rearwardly from the duct 122 (see FIGS. 1 and 2).

The electric motor 134 rotates the propeller 132. The electric motor 134 includes a rotor 136 and a stator 138. The rotor 136 and stator 138 each have a tubular shape. The rotor 136 is disposed radially inward of the stator 138. The rotor 136 and the stator 138 are arranged on the same axis. The rotor 136 is rotatably supported against the duct 122. The rotor 136 rotates about the propeller rotation axis L with respect to the stator 138. The propeller 132 is disposed radially inward of the rotor 136. The propeller 132 is fixed to the rotor 136 and rotates along with the rotor 136. The rotor 136 includes a plurality of permanent magnets 140. The plurality of permanent magnets 140 are arranged along the circumferential direction of the rotor 136. In FIG. 3, only one of the plurality of permanent magnets 140 is labeled with the reference character 140, and the reference characters of the other permanent magnets 140 are omitted.

The stator 138 is fixed to the duct 122. The stator 138 includes a plurality of coils 142. The plurality of coils 142 are arranged along the circumferential direction of the stator 138. When the plurality of coils 142 are energized, an electromagnetic force is generated to rotate the rotor 136. In FIG. 3, only one of the plurality of coils 142 is labeled with the reference characters 142, and the reference characters of the other coils 142 are omitted. With the above configuration, the propeller 132 generates a forward propulsive force when the electric motor 134 rotates in a normal rotation direction and a rearward propulsive force when the electric motor 134 rotates in a reverse rotation direction.

In the electric propulsion device 100, the lower housing 120 is pivotably attached to the middle housing 140 around a steering axis (an axis along the upper-lower direction in each figure) as a vertical pivot axis. The middle housing 140 accommodates a gear mechanism (not shown) to allow the lower housing 120 to pivot. As the lower housing 120 pivots, the drive unit 130 also pivots about the steering axis.

Figure 4:
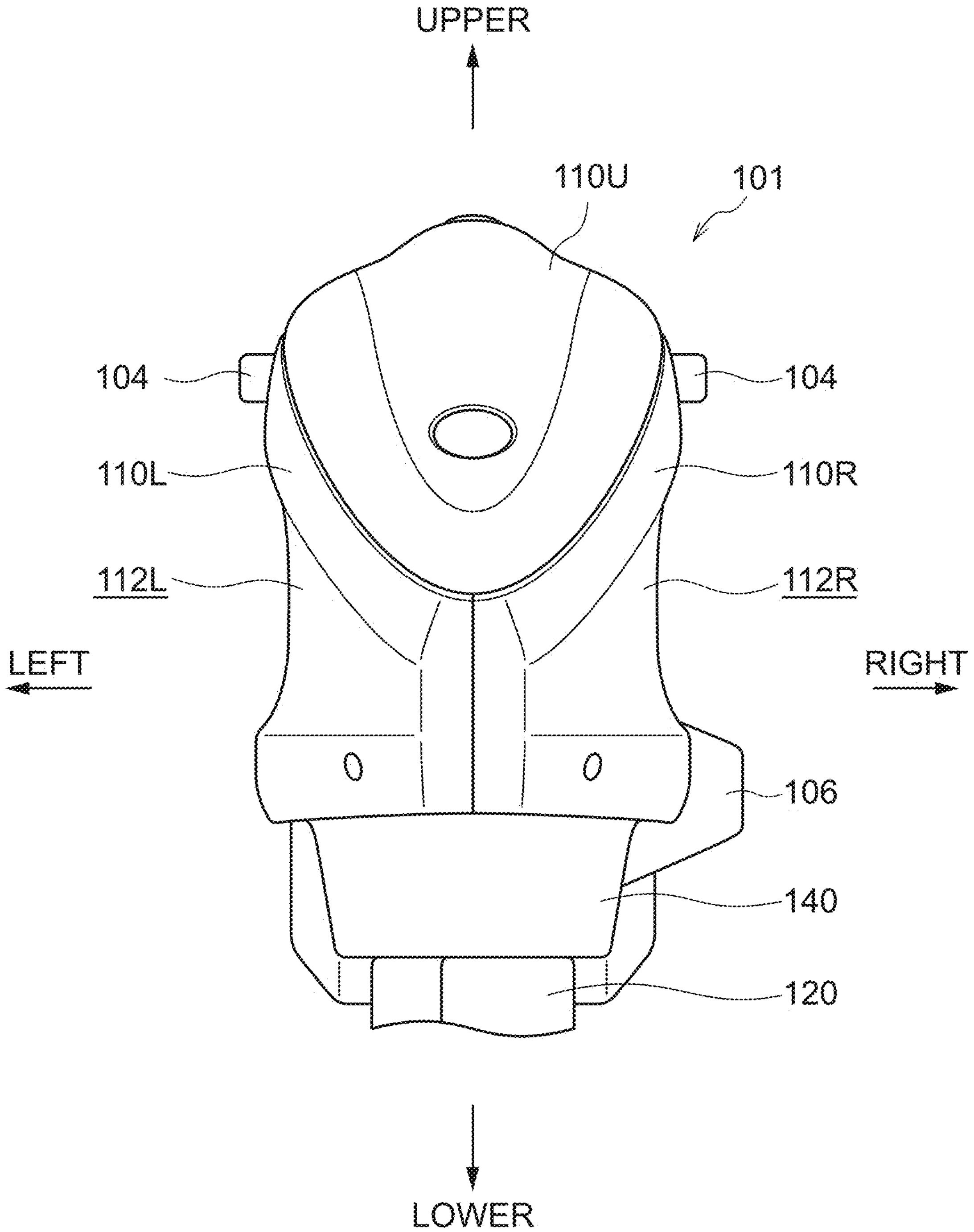
FIG. 4 is a rear view illustrating an external configuration of a cowl.
Figure 5:
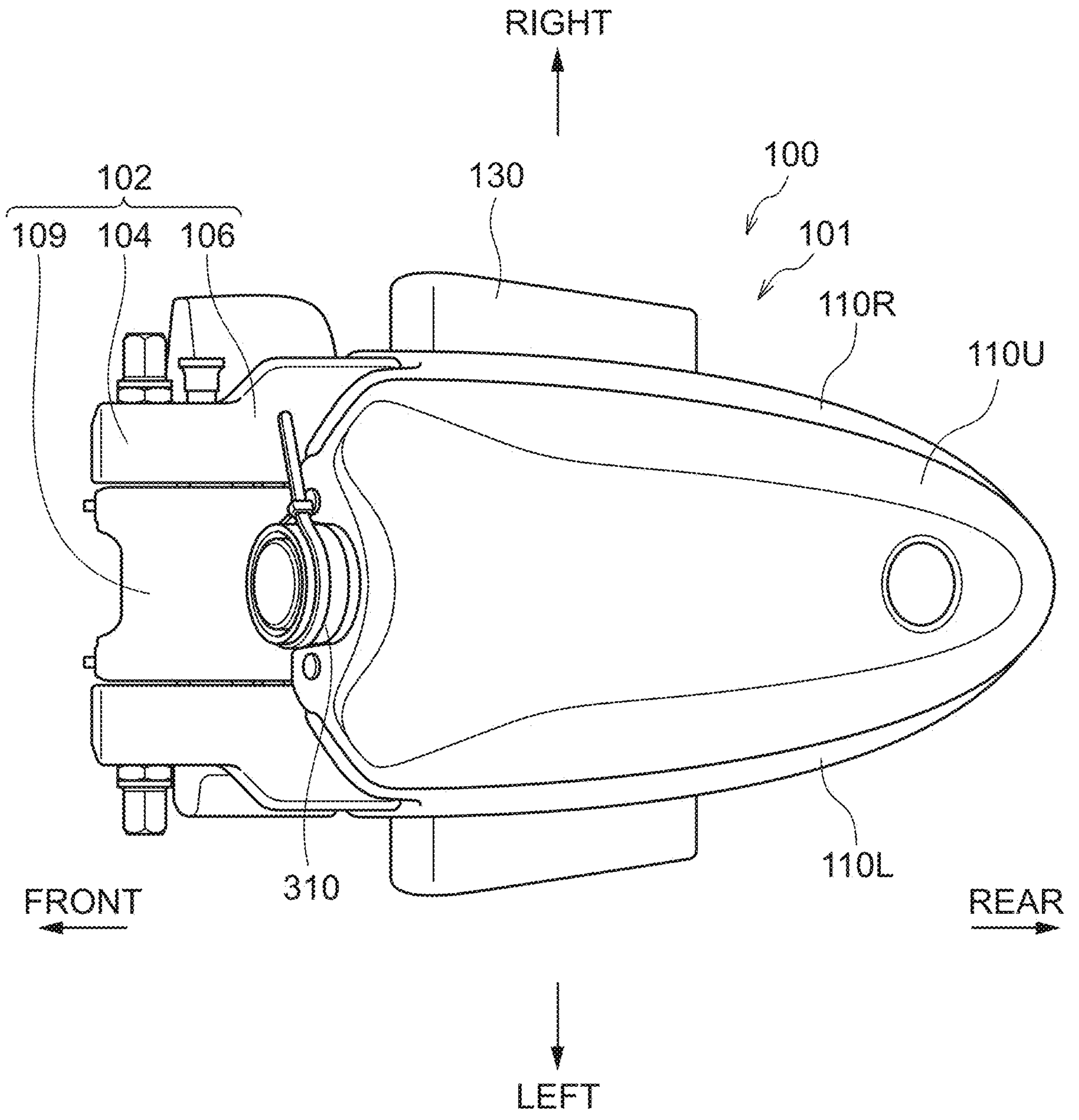
FIG. 5 is a top view illustrating an external configuration of the cowl.
Figure 6:
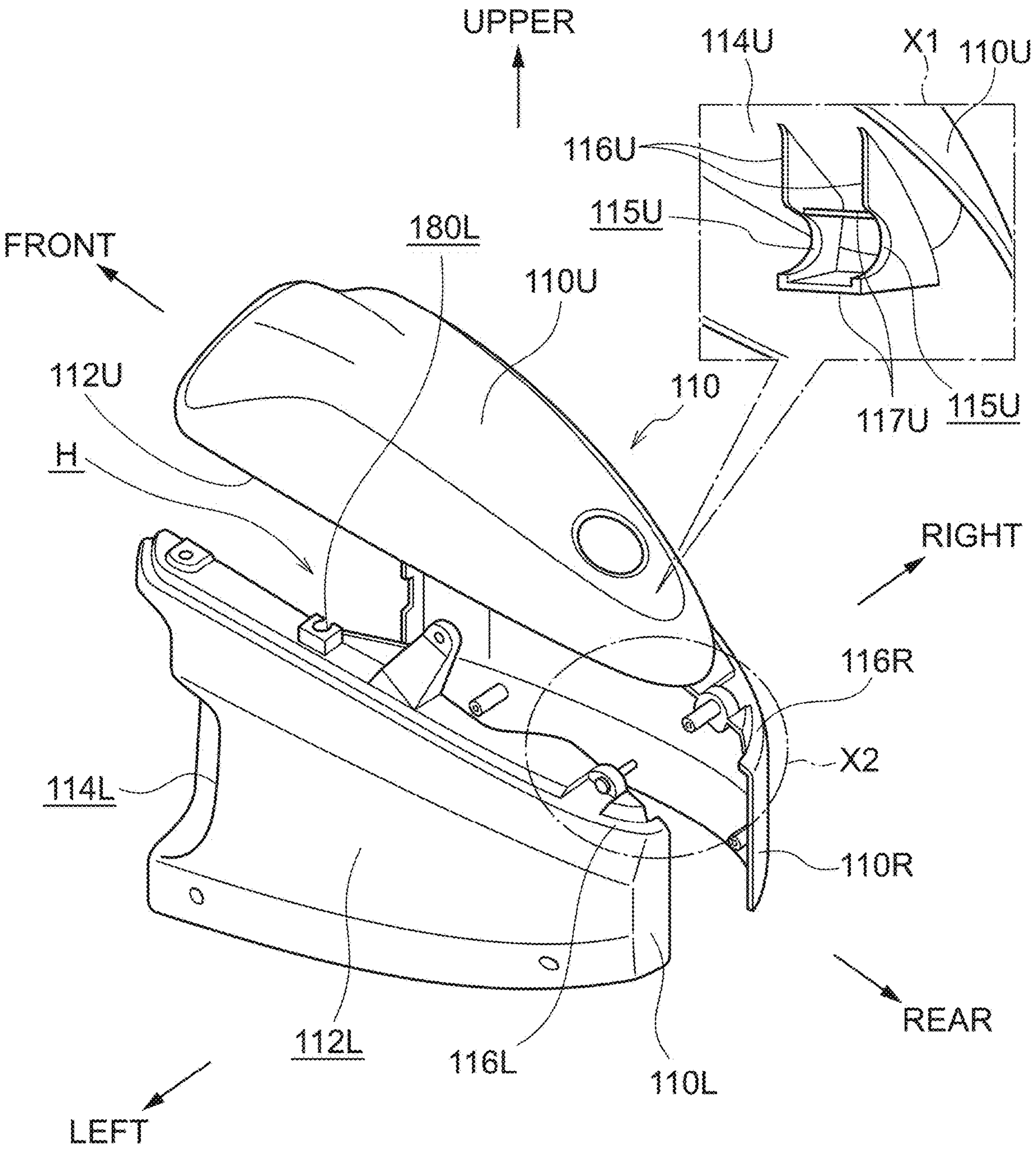
FIG. 6 is a perspective view illustrating a disassembled state of the cowl.

FIG. 4 is a rear view illustrating an external configuration of the cowl 110, FIG. 5 is a top view illustrating an external configuration of the cowl 110, and FIG. 6 is a perspective view illustrating a disassembled state of the cowl 110. FIG. 6 also shows the lower surface portion X1 of the rear end of the upper cover 110U, which will be described below. As shown in FIGS. 4 to 6, the cowl 110 includes the upper cover 110U, a left cover 110L, and a right cover 110R. The upper cover 110U is an example of a cover, and the left cover 110L and the right cover 110R are an example of a pair of facing covers.

The left cover 110L and the right cover 110R are arranged to face each other across the internal structure 300 in the horizontal (left-right) direction, i.e., the left cover 110L and the right cover 110R sandwich the internal structure 300 therebetween. The left cover 110L covers the left side of the internal structure 300, and the right cover 110R covers the right side of the internal structure 300. The lower ends of each cover 110L and 110R are fixed to the internal structure 300 by a pair of lower fixing members (fasteners) T1, T1 (e.g., screws) (see FIG. 2). The left cover 110L and the right cover 110R define an opening H that exposes the upper portion of the internal structure 300 (e.g., see FIG. 6 and FIG. 10).

The shape of each cover 110L, 110R is as follows. The lower end of each cover 110L, 110R extends along the horizontal (front-rear) direction, and the upper end of each cover 110L, 110R slopes downward so that the distance from the lower end of each cover 110L, 110R becomes shorter as it approaches the rear end of each cover 110L, 110R (see FIG. 2). The outer surface of each cover 110L, 110R includes first recessed surfaces 112L, 112R and a second recessed surface 114L (the second recessed surface on the right side is not shown) (see FIGS. 4 and 6). The first recessed surfaces 112L, 112R extend from the front end to the rear end of each cover 110L, 110R. The width in the upper-lower direction of the first recessed surfaces 112L, 112R narrows as it approaches the rear end of each cover 110L, 110R. The second recessed surface 114L is a recessed surface provided at the rear end of the first recessed surfaces 112L, 112R and deeper than the first recessed surfaces 112L, 112R. The front end of the second recessed surface 114L is open forward. A side of the clamp bracket 106 of the suspension device 102 above is provided with a third recessed surface 108 extending in the front-rear direction, and the bottom of this third recessed surface 108 is flush with the bottom of the second recessed surface 114L (see FIG. 2 and FIG. 12 below).

The upper cover 110U closes the opening H and covers the top side of the internal structure 300 (see FIGS. 2, 4, and 5). The upper cover 110U has a lid shape with a downward opening, and the width in the left-right direction of the upper cover 110U becomes narrower as it approaches the rear end of the cover 110U.

The cowl 110 includes a pair of hooks 116U and a connector 150. In this configuration, both the pair of hooks 116U and the connector 150 are disposed inside the cowl 110 so that they are not exposed to the outside. The connector 150 extends in the left-right direction and connects the left cover 110L and the right cover 110R. The pair of hooks 116U are provided on the upper cover 110U (see lower surface portion X1 in FIG. 6) and engage the connector 150.

Specifically, the pair of hooks 116U are provided on the lower surface 114U of the upper cover 110U. In addition, the pair of hooks 116U are disposed on the front portion of the upper cover 110U. The pair of hooks 116U are spaced apart from each other in the left-right direction. Each hook 116U projects downwardly from the lower surface 114U. Each hook 116U includes a recessed hooking portion 115U that opens forward. Each hook 116U is flat plate-shaped in the left-right direction. The pair of hooks 116U are connected to each other by hook stiffeners 117U extending in the left-right direction, which reduce or prevent deformation of each hook 116U. The thickness D1 of each hook 116U is thinner than the thickness D2 of the upper cover 110U (see FIG. 8). Thus, deformation due to thermal expansion of the hooks 116U can be reduced or prevented from affecting the shape of the upper cover 110U compared to a configuration in which, for example, the thickness D1 of the hooks 116U is thicker than the thickness D2 of the upper cover 110U.

Figure 7:
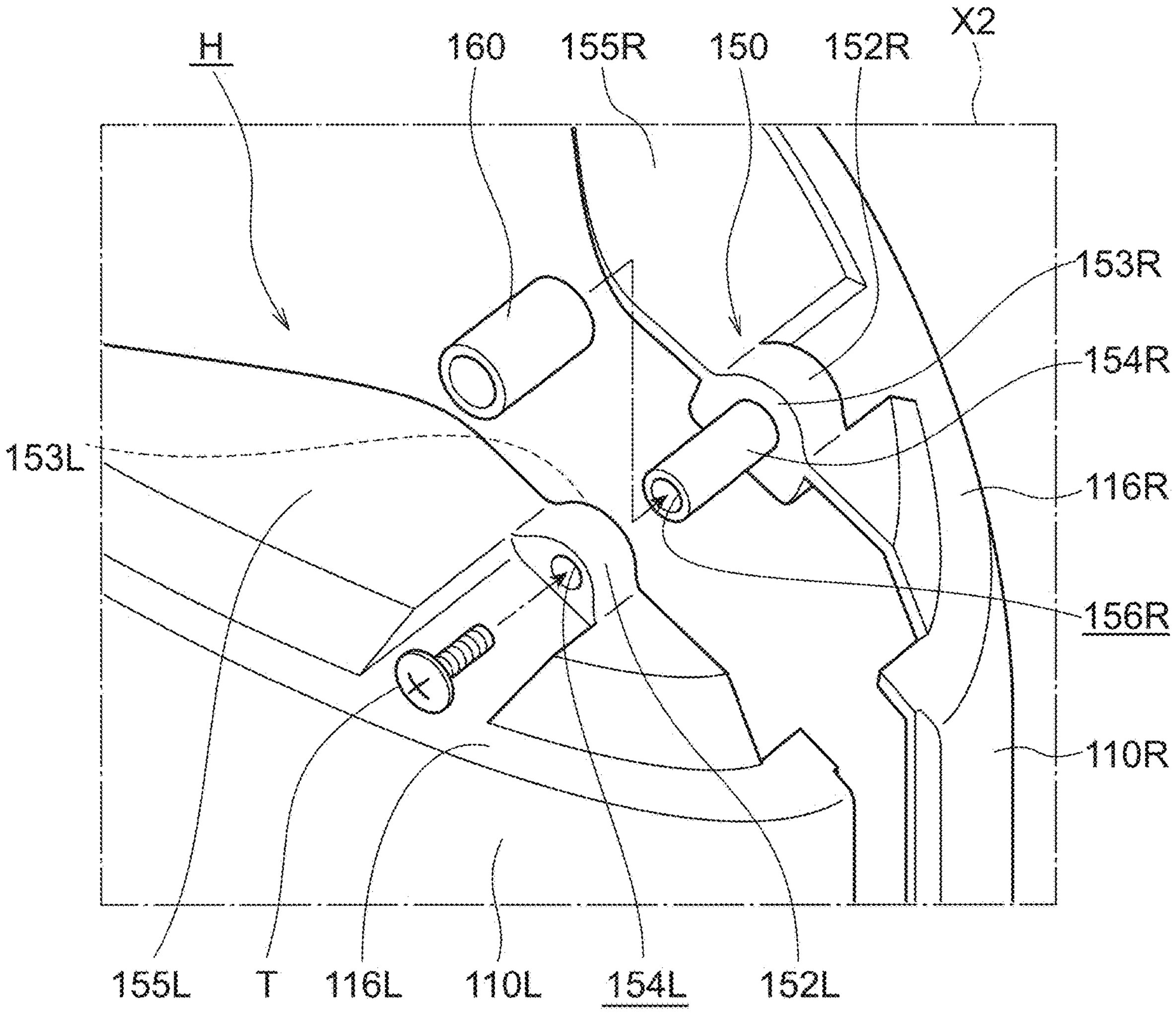
FIG. 7 is a perspective view illustrating components of a connector.
Figure 8:
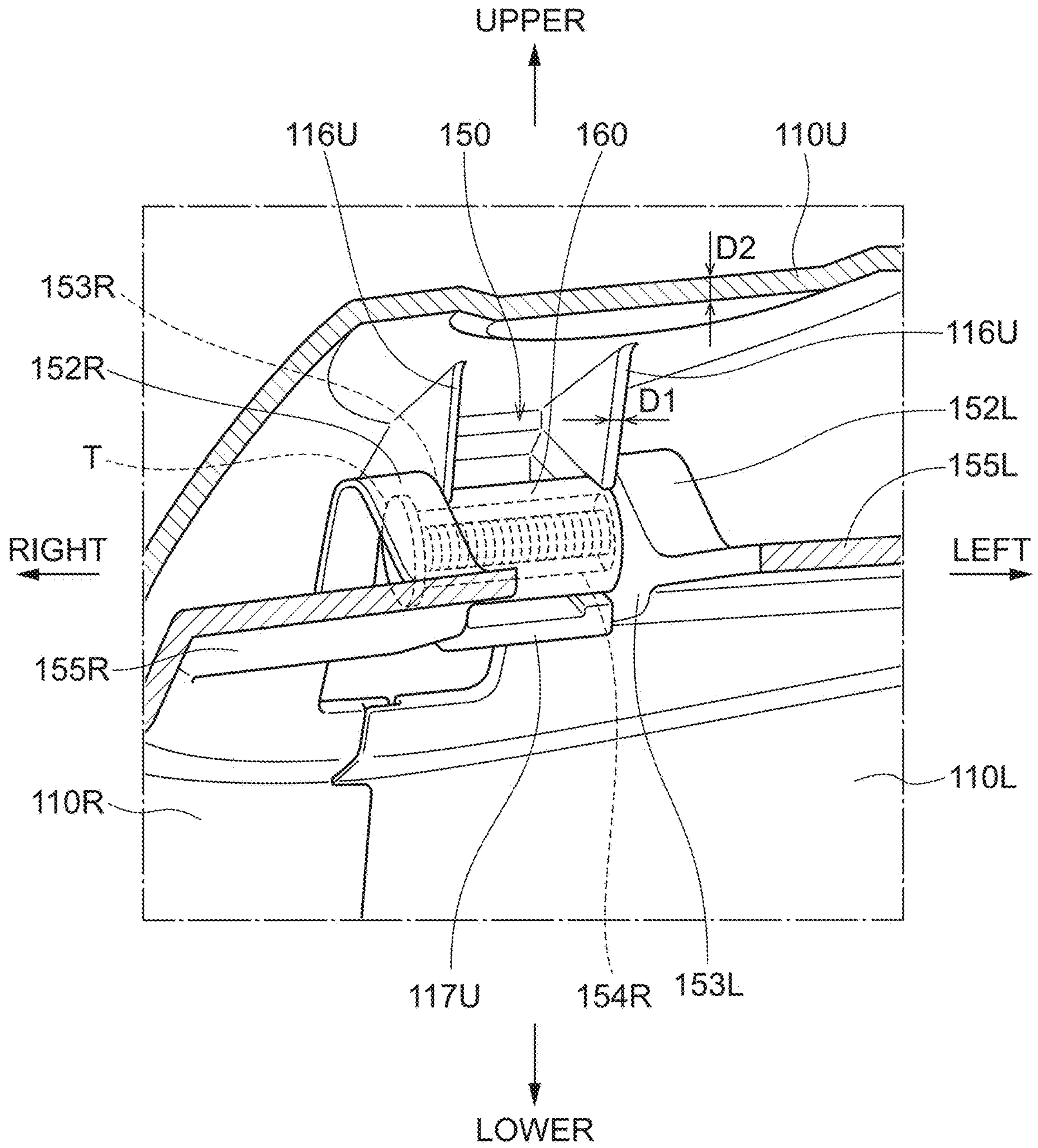
FIG. 8 is a perspective view illustrating the engagement between the hook and the connector.

FIG. 7 is a perspective view illustrating components of the connector 150, and FIG. 8 is a perspective view illustrating the engagement between the pair of hooks 116U and the connector 150. FIG. 7 shows an enlarged portion X2 of FIG. 6. As shown in FIG. 7, the connector 150 includes a screw receptacle 152L, a cylinder 154R, and a fixing screw T (e.g., a tapping screw). The fixing screw T is an example of an insert.

The screw receptacle 152L is provided on the left cover 110L. Specifically, the left cover 110L includes a reinforcing portion 155L, and the reinforcing portion 155L extends inward (to the right) from the upper end surface 116L of the left cover 110L. The screw receptacle 152L is provided in this reinforcing portion 155L. The screw receptacle 152L includes an insertion hole 154L extending in the left-right direction. The cylinder 154R is provided on the right cover 110R. Specifically, the right cover 110R includes a reinforcing portion 155R, and the reinforcing portion 155R extends inward (left side) from the upper end surface 116R of the right cover 110R. The cylinder 154R extends from this reinforcing portion 155R in a left-right direction. The cylinder 154R is provided with a screw hole 156U.

The fixing screw T is inserted through the insertion hole 154L of the screw receptacle 152L and screwed into the screw hole 156U of the cylinder 154R. As a result, the connector 150 connects the left cover 110L and the right cover 110R. In the present example embodiment, an elastic member 160 is disposed between the connector 150 and each hook 116U. Specifically, the elastic member 160 is a tubular body made of an elastic material such as rubber and is arranged to surround the cylinder 154R.

In the connector 150, each hook 116U engages the portion where the fixing screw T provided through the left cover 110L is inserted into the cylinder 154R provided on the right cover 110R (see FIG. 8). In other words, each hook 116U engages the portion where the cylinder 154R and the fixing screw T overlap. This allows the load from the hooks 116U to be distributed between the left cover 110L and the right cover 110R.

The left cover 110L and the right cover 110R each include contact portions 153L and 153R, respectively, that contact each hook 116U in the left-right direction. Specifically, the contact portion 153L is the inner surface of the screw receptacle 152L and contacts the left side of the left hook 116U. The contact portion 153R is provided on the reinforcing portion 155R and includes an inner side facing the inner side of the screw receptacle 152L in the left-right direction. The cylinder 154R is provided on this inner side, and the surrounding surface of the cylinder 154R is the contact portion 153R. The contact portion 153R contacts the right side of the right hook 116U. In other words, the pair of hooks 116U are sandwiched between the contact portions 153L and 153R in the left-right direction, thus restricting the left-right movement of the pair of hooks 116U. The elastic member 160 is also sandwiched between the contact portions 153L and 153R in the left-right direction, thus restricting the left-right movement of the elastic member 160.

Figure 9:
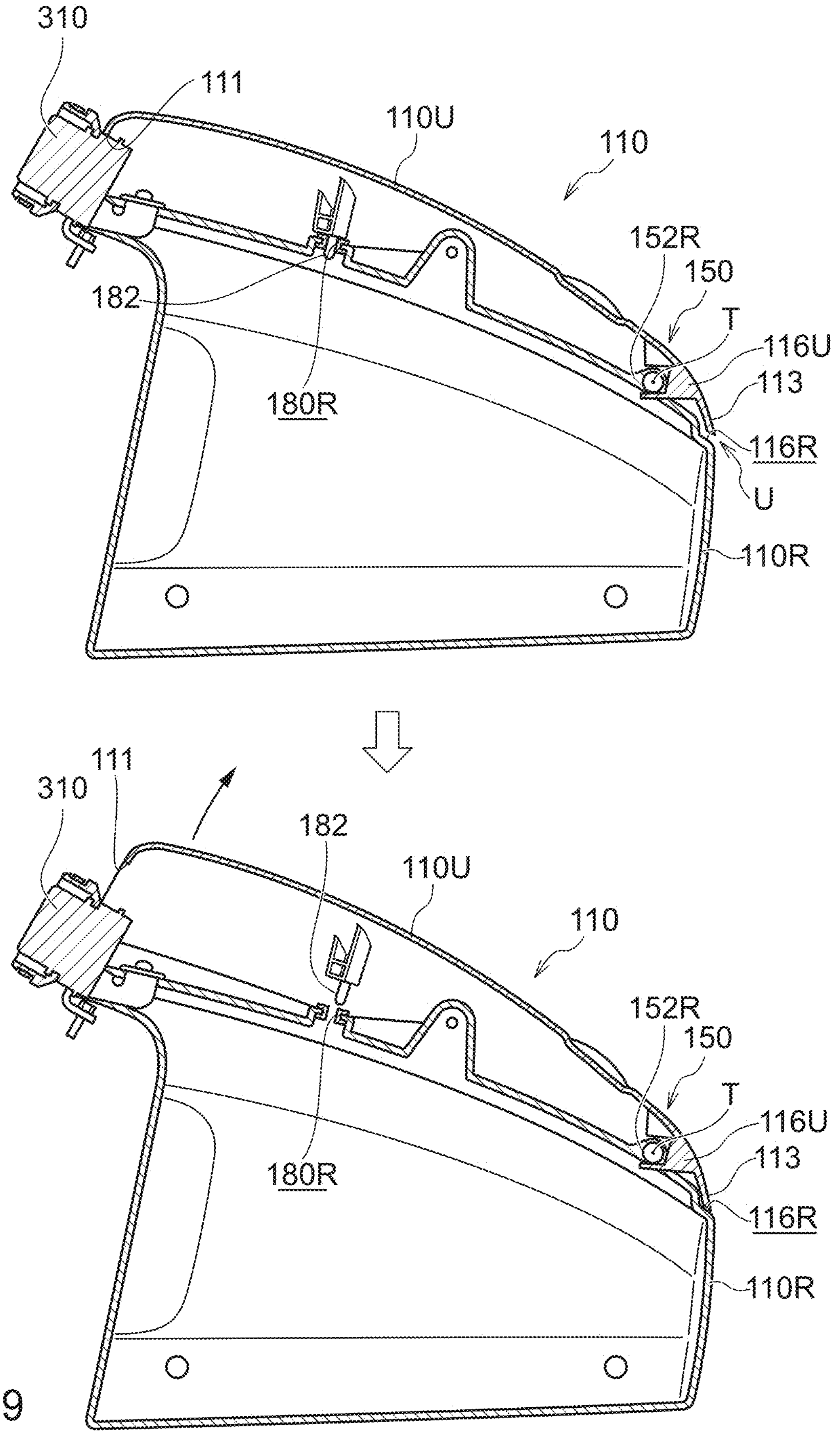
FIG. 9 is an explanatory view illustrating the pivoting of the upper cover.

FIG. 9 is an explanatory view illustrating the pivoting of the upper cover 110U. The upper cover 110U is configured to pivot about the connector 150 (fixing screw T) and is movable to a closed position and an opened position. The closed position covers the opening H defined by the left cover 110L and the right cover 110R (see the upper view in FIG. 9). The opened position opens at least a portion of the opening H (see the lower view in FIG. 9). When the upper cover 110U is in the closed position, the upper cover 110U covers the entire opening H, and the front end 111 of the upper cover 110U contacts the wiring support 310 described below.

The rear end 113 of the upper cover 110U is separated in the upper-lower direction from both the upper end surface 116L of the left cover 110L and the upper end surface 116R of the right cover 110R. Thus, a gap U is provided in the upper-lower direction between the rear end 113 of the upper cover 110U and the upper end surfaces 116L, 116R. In the present example embodiment, the lower surface 1120 of the periphery of the upper cover 110U is spaced apart from the upper end surfaces 116L, 116R in the upper-lower direction over the entire circumference. This can reduce or prevent displacement or deformation of the upper cover 1100 due to displacement or deformation of the left cover 110L and the right cover 110R (see FIG. 2).

On the other hand, as shown in the lower figure of FIG. 9, when the upper cover 110U is in the opened position, the upper cover 110U pivots about the connector 150, and the front end 111 of the upper cover 110U is separated from the wiring support 310. In this action, the presence of the gap U allows the upper cover 110U to pivot while reducing or preventing interference with the respective covers 110L, 110R. When the upper cover 110U is moved from the closed position to the opened position and the rear end 113 of the upper cover 110U is displaced rearwardly, the pair of hooks 116U can be removed from the left cover 110L and the right cover 110R by disengaging the hooks 116U and the connector 150.

In the upper end surfaces 116L, 116R of each cover 110L, 110R, recesses 180L, 180R are provided (see FIGS. 6 and 9). Each recess 180L, 180R is open upwardly. The upper cover 110U is provided with a pair of protrusions 182. Each protrusion 182 protrudes downwardly. The pair of protrusions 182 are inserted into the recesses 180L, 180R when the upper cover 110U is in the closed position (see the upper figure in FIG. 9) and are released from the recesses 180L, 180R when the upper cover 110U is in the opened position (see the lower figure in FIG. 9).

Figure 10:
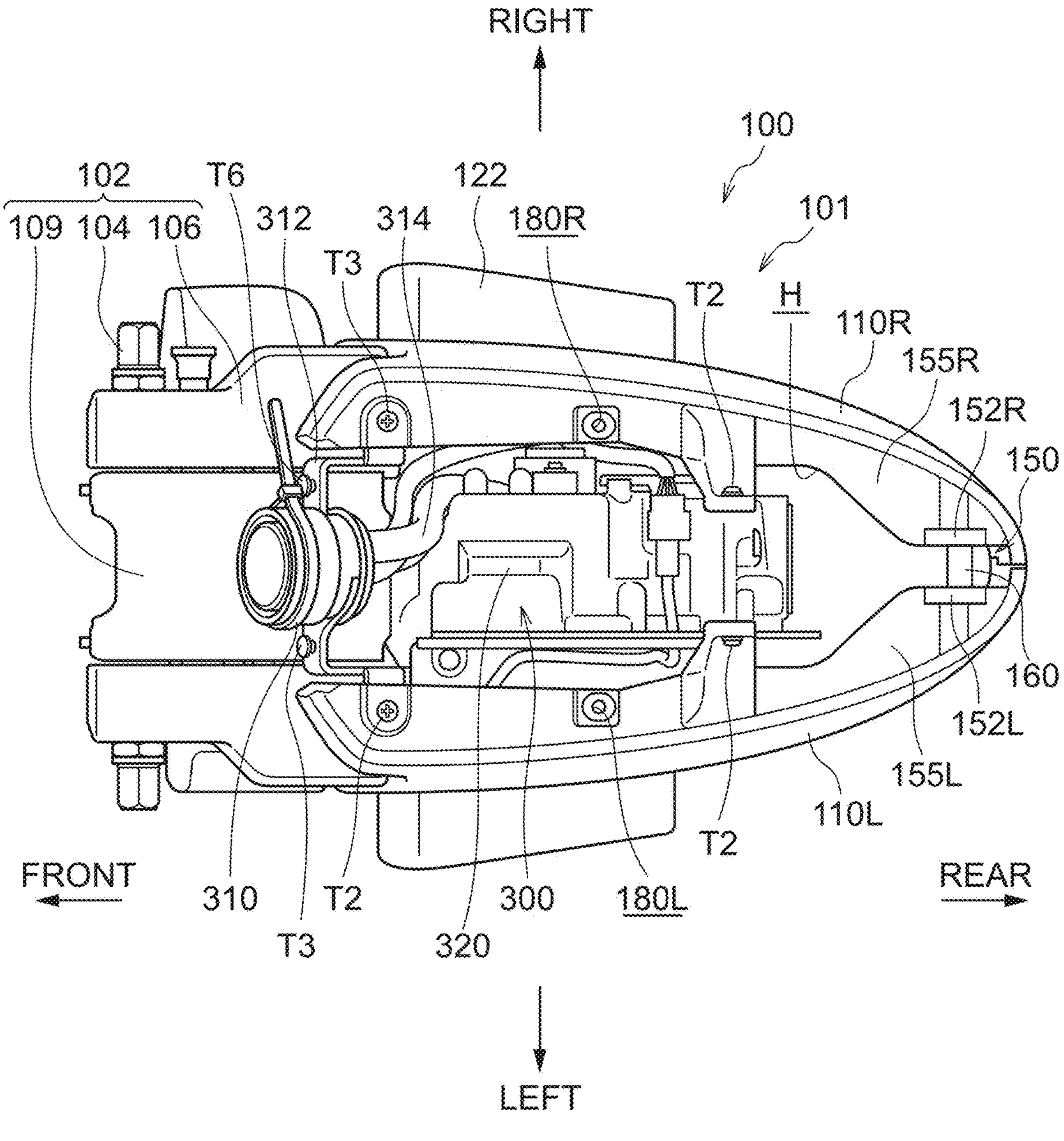
FIG. 10 is a top view illustrating the electric propulsion device with the upper cover removed.
Figure 11:
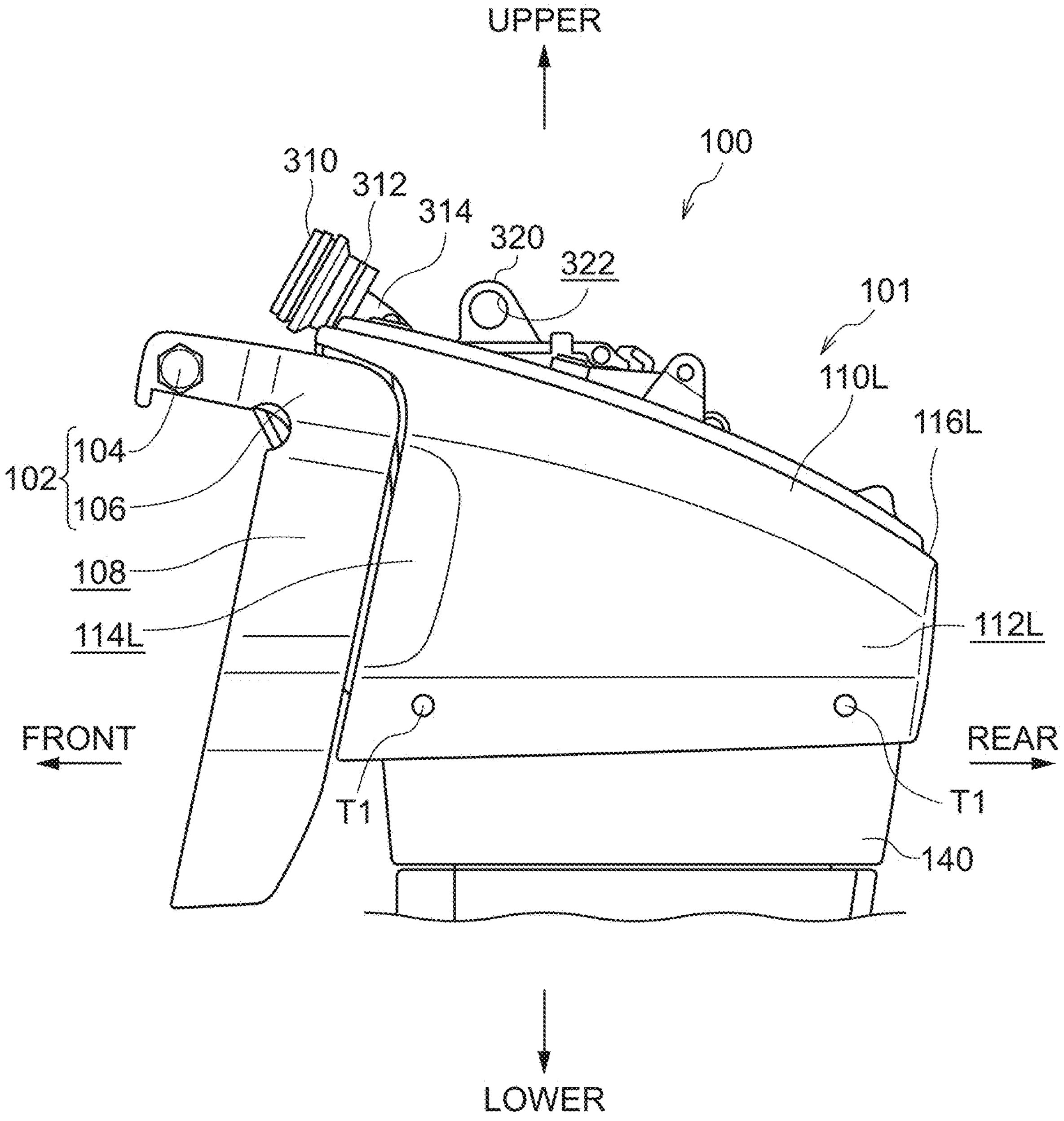
FIG. 11 is a side view illustrating the electric propulsion device with the upper cover removed.
Figure 12:
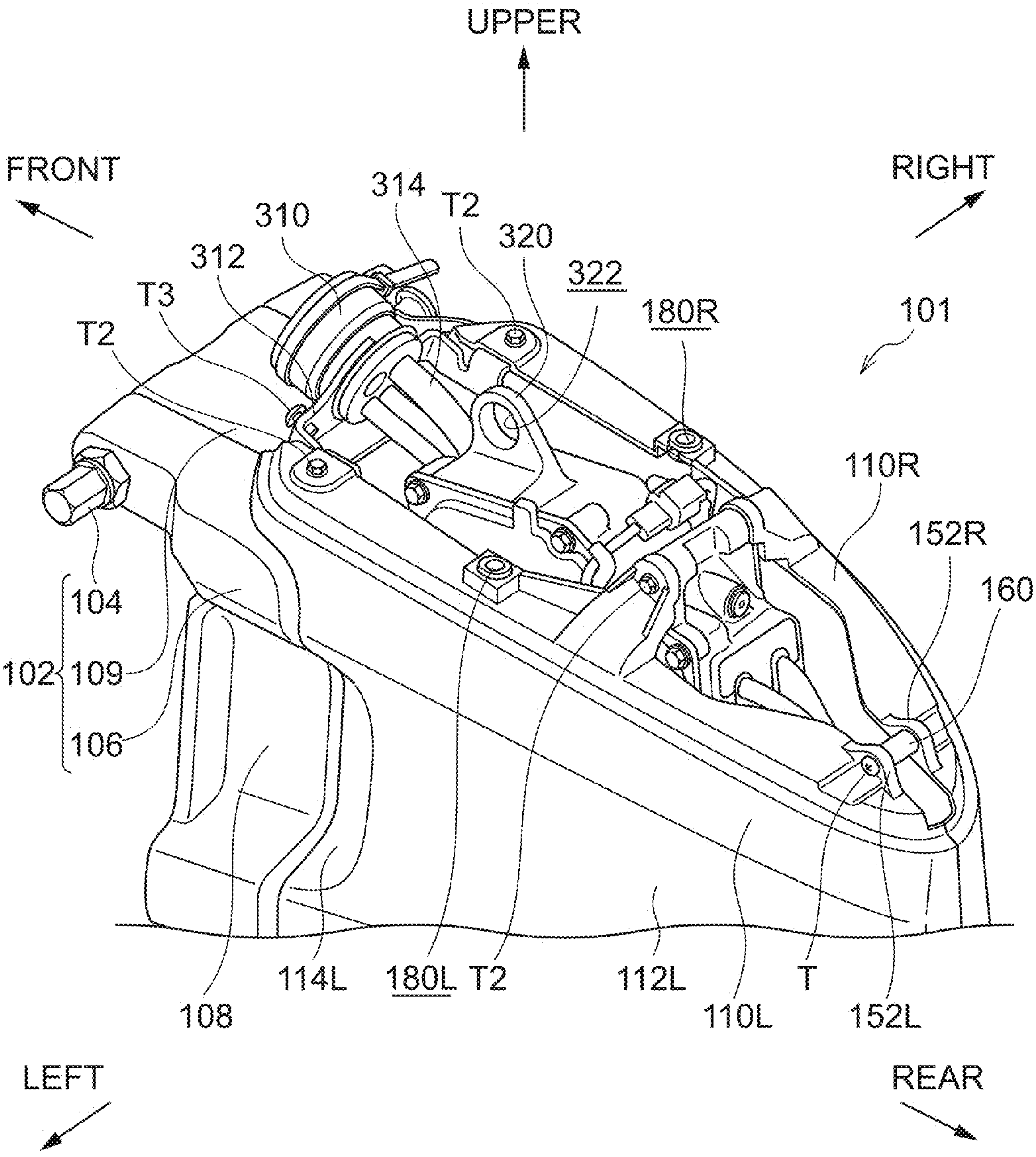
FIG. 12 is a perspective view illustrating the electric propulsion device with the upper cover removed.

FIG. 10 is a top view illustrating the electric propulsion device 100 with the upper cover 110U removed, FIG. 11 is a side view illustrating the electric propulsion device 100 with the upper cover 110U removed, and FIG. 12 is a perspective view illustrating the electric propulsion device 100 with the upper cover 110U removed. As shown in FIGS. 10 and 12, the cowl 110 includes four first fixing members (fasteners) T2 to fix the left cover 110L and the right cover 110R to the internal structure 300. One pair of the first fixing members T2 are inserted into the rear portions of the left cover 110L and the right cover 110R in the left-right direction and fixed to the internal structure 300. The other pair of the first fixing members T2 are inserted into the front portions of the left cover 110L and the right cover 110R in the upper-lower direction and fixed to the internal structure 300. When the upper cover 110U is in the closed position, the upper cover 110U covers all four of the first fixing members T2 (see FIGS. 4 and 5). Here, the first fixing members T2 are male screws, but they may be engagement claws or press-fit protrusions.

The electric propulsion device 100 is further provided with a wiring support 310 and a hang tab 320. The wiring support 310 is a tubular member to bundle wires 314 connected to the internal structure 300 and guide them to the hull 10 side. The wiring support 310 is disposed in the front side of the opening H so that it protrudes upwardly from the opening H (see FIG. 11). The wiring support 310 is fixed to the internal structure 300 via a fixing jig 312. When the upper cover 110U is in the closed position, only a portion (rear end) of the wiring support 310 is covered by the upper cover 110U (see FIGS. 2 and 5).

The hang tab 320 includes a through hole 322 through which a hook of a crane truck (not shown) or the like can be hooked. The hang tab 320 is positioned in the internal structure 300 to be exposed to the opening H. The hanging portion (through hole 322) of the hang tab 320 protrudes upwardly from the opening H (see FIG. 11). When the upper cover 110U is in the closed position, the entire hang tab 320 is covered by the upper cover 110U (see FIGS. 2 and 5).

The cowl 110 further includes a pair of second fixing members T3 to fix the front portion of the upper cover 110U to the internal structure 300. When the upper cover 110U is in the closed position, the front portion of the upper cover 110U is positioned to cover the fixing jig 312 from the front. A pair of the second fixing members T3 are inserted into the front portion of the upper cover 110U in the front-rear direction and fixed to the fixing jig 312. Here, the second fixing members T3 are male screws, but they may be an engagement claw or a press-fit projection.

In an example embodiment of the electric propulsion device 100, the connector 150 extends in the left-right direction and connects the left cover 110L and the right cover 110R. A pair of hooks 116U are provided on the upper cover 110U (see lower surface portion X1 in FIG. 6) and engage the connector 150 (see FIGS. 6 and 8). Thus, according to the present example embodiment, the hook 116U of the upper cover 110U engages the connector 150 that connects the left cover 110L and the right cover 110R, so that the left cover 110L, the right cover 110R, and the upper cover 110U can be aligned and positioned with high precision.

In an example embodiment, both the pair of hooks 116U and the connector 150 are arranged inside the cowl 110 so that they are not exposed to the outside. This improves the design and appearance of the electric propulsion device 100. The upper cover 110U is configured to pivot about the connector 150 (fixing screw T) to be displaced between the closed and opened positions (see FIG. 9). This allows the upper cover 110U to be easily displaced between the closed and opened positions by pivoting about the connector 150, while maintaining the positional relationship of the three covers 110U, 110L, and 110R. In addition, only the upper cover 110U can be removed to perform work (e.g., maintenance work) on the internal structure 300.

In an example embodiment, the pair of protrusions 182 are inserted into the recesses 180L, 180R when the upper cover 110U is in the closed position and are released from the recesses 180L, 180R when the upper cover 110U is in the opened position (see FIG. 9). This allows the three covers 110, 110L, and 110R to be more precisely aligned and positioned when the upper cover 110U is in the closed position as the protrusion 182 is inserted into the recesses 180L, 180R.

In an example embodiment, the elastic member 160 is disposed between the connector 150 and each hook 116U (see FIGS. 7 and 8). This can reduce or prevent rattling of the upper cover 110U against the left cover 110L and the right cover 110R and absorb vibration.

In an example embodiment, the hang tab 320 is provided at the position of the internal structure 300 that is exposed to the opening H. Only the upper cover 110U can be removed and the hang tab 320 can be used to lift up the electric propulsion device 100. The hanging portion (through hole 322) of the hang tab 320 protrudes upwardly from the opening H (see FIG. 11). This allows the electric propulsion device 100 in, e.g., a side-lying position to be lifted up by using the hang tab 320.

In an example embodiment, the cowl 110 further includes a pair of second fixing members T3 to fix the front portion of the upper cover 110U to the internal structure 300. This allows the left cover 110L, the right cover 110R, and the upper cover 110U to be precisely aligned and positioned, while reducing or preventing the influence of the second fixing members T3 on the appearance and design of the electric propulsion device 100 when the electric propulsion device 100 is viewed from the rear.

The technologies disclosed herein are not limited to the example embodiments described above, but can be modified into various forms to the extent not departing from the gist of the present invention, for example, the following modifications are possible.

The configuration of the boat 1 in the above example embodiments is only an example and can be modified in various ways. For example, in the above example embodiments, the electric propulsion device 100 is shown as an example of the boat propulsion device, but an outboard motor, an inboard/outboard motor, or a jet propulsion system can also be used, for example. The drive source for these outboard motors may be an electric motor or an internal combustion engine. In the above example embodiments, the internal structure 300 provided with a motor control unit that controls the electric motor 134 and gear mechanism is illustrated as an internal structure, but an internal structure provided with an engine control unit or other drive source (such as an internal combustion engine) may also be used.

In the above example embodiments, the cowl 110 may include one or more than three hooks 116U. However, the upper cover with multiple hooks will be able to stabilize the position of the upper cover relative to a pair of facing covers more effectively than the upper cover with only one hook.

In the above example embodiments, at least one of the hooks 116U and the connector 150 may be exposed to the outside. In the above example embodiments, the hook 116U is configured to rotatably engage the cylindrical connector 150 to allow the upper cover 110U to pivot, but the configuration is not limited to this. For example, the hook may be configured to slide in a predetermined direction (e.g., forward direction) against the connector for engagement to allow the upper cover 110U to slide and move.

In the above example embodiments, the connector 150 has a threaded structure in which the fixing screw T is screwed into the cylinder 154R, but the configuration is not limited to this. For example, the connector 150 may have a press-fit structure in which an insert is press-fitted into the cylinder. The connector 150 may not have the elastic member 160. In the above example embodiments, the protrusions 182 may be provided on each cover 110L, 110R, and the recesses 180L, 180R may be provided on the upper cover 110U.

In the above example embodiments, the pair of facing covers is exemplified as the left cover 110L and the right cover 110R facing in the left-right direction, but the configuration is not limited to this. For example, they may be a pair of facing covers facing in other directions, such as the upper-lower direction or the front-rear direction, for example.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A boat propulsion device comprising:
- an internal structure;
- a pair of facing covers facing each other across the internal structure in a first direction along a horizontal direction and defining an opening to expose an upper portion of the internal structure;
- a connector extending in the first direction and connecting the pair of facing covers together; and
- an upper cover to cover the opening and including a hook to engage the connector.

2. The boat propulsion device according to claim 1, wherein
- the connector is provided on facing walls of the pair of facing covers;
- the hook is provided on a lower surface of the upper cover; and
- the connector and the hook are covered by the pair of facing covers and the upper cover.

3. The boat propulsion device according to claim 2, wherein the upper cover is operable to pivot about the connector between a closed position that covers the opening and an opened position that opens at least a portion of the opening, and is detachable from the pair of facing covers.

4. The boat propulsion device according to claim 3, wherein
- one of the upper cover and the facing cover is provided with a recess; and
- the other of the upper cover and the facing cover is provided with a protrusion insertable into the recess when the upper cover is in the closed position and releasable from the recess when the upper cover is in the opened position.

5. The boat propulsion device according to claim 2, further comprising an elastic body between the connector and the hook.

6. The boat propulsion device according to claim 2, wherein
- the internal structure includes at least one of a controller and a drive source;
- the boat propulsion device further comprises a fastener to fix the pair of facing covers to the internal structure; and
- the upper cover covers the fastener.

7. The boat propulsion device according to claim 6, wherein the upper cover includes a lower edge spaced apart from the pair of facing covers.

8. The boat propulsion device according to claim 1, wherein the upper cover is operable to pivot about the connector between a closed position that covers the opening and an opened position that opens at least a portion of the opening, and is detachable from the pair of facing covers.

9. The boat propulsion device according to claim 8, wherein
- one of the upper cover and the pair of facing covers includes a recess; and
- the other of the upper cover and the pair of facing covers includes a protrusion to be inserted into the recess when the upper cover is in the closed position, spaced apart from the recess when the upper cover is in the opened position.

10. The boat propulsion device according to claim 8, wherein the internal structure includes a hang tab exposed to the opening.

11. The boat propulsion device according to claim 10, wherein the hang tab includes a hanging portion that protrudes upwardly from the opening.

12. The boat propulsion device according to claim 1, further comprising an elastic body between the connector and the hook.

13. The boat propulsion device according to claim 1, wherein
- the internal structure includes at least one of a controller and a drive source;
- the boat propulsion device further comprises a fastener to fix the pair of facing covers to the internal structure; and
- the upper cover covers the fastener.

14. The boat propulsion device according to claim 13, wherein the upper cover includes a lower edge spaced apart from the pair of facing covers.

15. The boat propulsion device according to claim 1, wherein each of the facing covers includes a contact portion that contacts the hook in the first direction.

16. The boat propulsion device according to claim 1, wherein the connector is located at a rear end of the upper cover; and the boat propulsion device further comprises a fastener to fix a front end of the upper cover to the internal structure.

17. The boat propulsion device according to claim 1, wherein the connector includes a cylinder on one of the pair of facing covers, and an insert on the other of the pair of facing covers inserted into the cylinder.

18. The boat propulsion device according to claim 17, wherein the hook engages a portion of the connector where the insert is inserted into the cylinder.

19. A boat comprising:

a hull; and the boat propulsion device according to claim 1 attached to a rear portion of the hull.

20. A boat propulsion device comprising:

an internal structure;

a pair of facing covers facing each other across the internal structure in a first direction and defining an opening to expose a side of the internal structure in a second direction perpendicular to the first direction;

a connector extending in the first direction and connecting the pair of facing covers together; and a cover to cover the opening and including a hook to engage the connector.

* * * * *